United States Patent [19]

Labes

[11] 4,138,358

[45] Feb. 6, 1979

[54] LIQUID CRYSTAL COMPOSITIONS

[75] Inventor: Mortimer M. Labes, Philadelphia, Pa.

[73] Assignee: Temple University, Philadelphia, Pa.

[21] Appl. No.: 830,204

[22] Filed: Sep. 2, 1977

Related U.S. Application Data

[63] Continuation of Ser. No. 656,613, Feb. 9, 1976, abandoned.

[51] Int. Cl.² .......................... C09K 3/34; G02F 1/13
[52] U.S. Cl. .................... 252/299; 252/408; 350/350
[58] Field of Search .................. 252/299, 408; 350/160 LC, 350

[56] References Cited

U.S. PATENT DOCUMENTS

| | | | |
|---|---|---|---|
| 3,815,972 | 6/1974 | Hsieh | 252/299 |
| 3,853,785 | 12/1974 | Lades | 252/299 |
| 3,880,767 | 4/1975 | Chang et al. | 252/299 |
| 3,891,307 | 6/1975 | Tsukamoto et al. | 252/299 |
| 3,927,066 | 12/1975 | Scherrer et al. | 252/299 |
| 3,947,375 | 3/1976 | Gray et al. | 252/299 |
| 3,954,653 | 5/1976 | Yamazaki | 252/299 |
| 3,977,767 | 8/1976 | Okuma et al. | 252/299 |
| 3,979,321 | 9/1976 | Couttet et al. | 252/299 |
| 3,994,567 | 11/1976 | Matsuo et al. | 252/299 |
| 4,011,173 | 3/1977 | Steinstrasser | 252/299 |
| 4,020,002 | 4/1977 | Oh | 252/299 |
| 4,083,797 | 4/1978 | Oh | 252/299 |

FOREIGN PATENT DOCUMENTS

| | | |
|---|---|---|
| 2502904 | 7/1975 Fed. Rep. of Germany | 252/299 |
| 2538865 | 3/1976 Fed. Rep. of Germany | 252/299 |

*Primary Examiner*—Benjamin R. Padgett
*Assistant Examiner*—T. S. Gron
*Attorney, Agent, or Firm*—Miller & Prestia

[57] ABSTRACT

Liquid crystal mixtutre of donor and acceptor molecules, the first consisting of a liquid crystal compound having an unshared electron pair (the donor) and the second generally consisting of an electron receptive compound such as a p-cyano-p'-alkyl- or alkoxy-substituted bipheny liquid crystal compound (the acceptor); together these compounds form a molecular complex with improved physical properties, including particularly a broader mesophasic temperature range, then would be expected from a simple combination of such liquid crystals.

12 Claims, No Drawings

LIQUID CRYSTAL COMPOSITIONS

This is a continuation of application Ser. No. 656,613, filed Feb. 9, 1976, now abandoned.

This invention pertains to liquid crystal compositions, generally binary systems, having extended liquid crystal temperature ranges and, perhaps, other improved properties. In particular, this invention pertains to particular combinations of liquid crystal compounds exhibiting such extended temperature ranges.

Liquid crystalline properties are exhibited when a compound is in a transition or mesophase between the solid and liquid or isotropic state. Extending this temperature range extends the potential application of any particular liquid crystalline compound or composition. Combinations of liquid crystals, including particularly binary mixtures, have been useful in that eutectics are often formed at particular concentration levels. These eutectics generally are reflected in a substantial drop in the temperature of transition from the solid phase to the liquid crystalline phase, while the liquid crystal to isotropic liquid transition is not affected markedly.

Notwithstanding these prior art combinations and mixtures, there remains a continuing need for liquid crystal compositions with broadened mesophasic temperature ranges.

It is therefore the general object of the present invention to provide liquid crystal mixtures, the constituents of which are selected to produce such a broadened mesophasic temperature range.

A more specific object of this invention is to provide specific binary combinations of compounds which interact with one another to provide a liquid crystal mixture having a broadened mesophasic temperature range in comparison to that which would be expected from a normal linear combination of the constituents. This broadening comes not only from a decrease in the solid-nematic transition temperatures, but in an increase in the nematic-isotropic transition temperature.

These objects, and others which will be apparent in the course of the subsequent description of this invention, are met by a liquid crystal mixture of donor and acceptor compounds, wherein the donor consists of any liquid crystal compound having an unshared electron pair and the acceptor consists of an electron deficient or receptive compound, such as a p-cyano-p'-alkyl- or alkoxy substituted biphenyl. Preferably, the donor or first liquid crystal compound in this mixture has a molecular structure as follows:

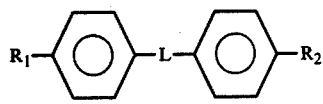

where L is a linkage moiety selected from the group consisting of —CH=N—, —N=N— and

and $R_1$ and $R_2$ are alkyl or alkoxy groups of 1 to 8 carbons with no branch chains on the α or β carbons. Preferred compounds included within this molecular structure are:

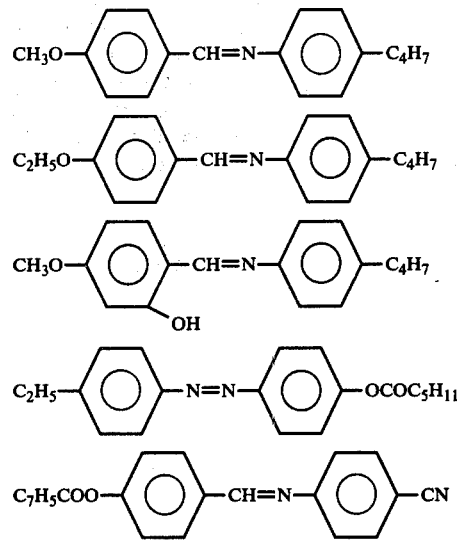

The preferred acceptor or second liquid crystal compound in the liquid crystal mixture of the present invention generally comprises a cyano-substituted biphenyl of the following molecular structure:

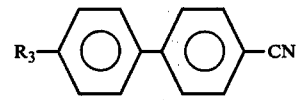

where $R_3$ is an alkyl or alkoxy group of 1 to 8 carbons with no chain branches on the α or β carbon.

More preferred compounds within this group include p-cyano-p'-pentylbiphenyl (CPB), p-cyano-p'-heptylbiphenyl, p-cyano-p'-pentyloxybiphenyl, p-cyano-p'-heptyloxybiphenyl, and p-cyano-p'-octyloxybiphenyl.

A preferred combination of liquid crystals in accordance with the present invention comprises a mixture of CPB, as the acceptor, and N-(p-methoxybenzylidene)-p-n-butylaniline (MBBA), the first of the specific donor compounds set forth above. Extended mesophasic temperature ranges for this combination is found throughout the concentration range from 10 to 90% of each. The composition exhibits low solid-nematic transition temperatures at about 14 and 73% CPB and an elevation of the nematic-isotropic transition temperature at about 50% CPB. It is theorized that eutectic compounds are formed at approximately 14 and 73% CPB and a combination of these compounds is found in the 50/50 mixture.

While liquid crystal mixtures, and particularly binary systems may exhibit broadened mesophasic temperature ranges through a wide range of compositions, this broadened temperature range generally reaches a single maximum at a 50/50 combination. The binary donor-acceptor mixtures of this invention show two such maxima as well as an increase in the nematic-isotropic transition temperature.

This may be due to the fact that the present invention is dependent upon a molecular complex formed between the donor compound with the unshared electron pair and the acceptor compound which is generally electron receptive. It is this molecular complex of the liquid crystal mixture components in the compositions of the present invention which is believed responsible for the improved physical properties, particularly including the broadened mesophasic temperature range referred to. This molecular complex is of course formed by virtue of a charge transfer interaction of components of the binary mixture. Other non-linearities in the physical properties of the mixtures of the type disclosed herein may be found with respect to dielectric properties and modulation of electro-optical properties.

While this invention has been described with reference to particular embodiments thereof, it should be understood that it is not limited thereto and that the intended claims are intended to be construed to cover such equivalent variations and modifications of this invention which may be made by those skilled in the art without departing from the true spirit and scope thereof.

I claim:

1. An eutectic liquid crystal mixture having an extended mesophase temperature range consisting of donor and acceptor compounds, said acceptor consisting of a p-cyano-p'-alkyl or -alkoxy substituted biphenyl liquid crystal compound, wherein said donor compound has the following molecular structure

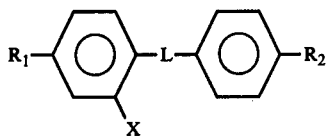

where L is a linkage moiety selcted from the group consisting of

—CH=N— and

—N=N—, $R_1$ and $R_2$ are alkyl or alkoxy or alkylester groups of 1 to 8 carbons with no branch chains on the $\alpha$ and $\beta$ carbons, and X is H or OH, with the proviso that $R_1$ always is alkyl and $R_2$ always is an alkoxy or alkylester group with the position of said $R_1$ and $R_2$ groups being interchangeable and the proviso that when X is OH, L is CH=N, $R_1$ is alkoxy or alkylester and $R_2$ is alkyl.

2. An eutectic liquid crystal mixture, as recited in claim 1, wherein said donor compound is:

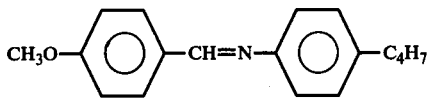

3. An eutectic liquid crystal mixture, as recited in claim 1, wherein said donor compound is:

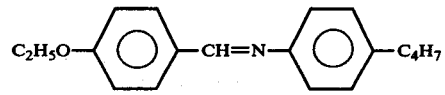

4. An eutectic liquid crystal mixture, as recited in claim 1, wherein said donor compound is

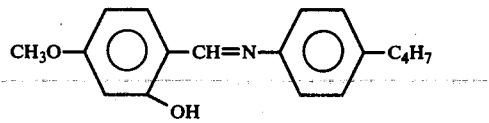

5. An eutectic liquid crystal mixture, as recited in claim 1, wherein said donor compound is

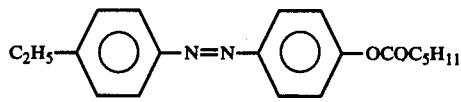

6. An eutectic liquid crystal mixture, as recited in claim 1, wherein said acceptor compound has the following molecular structure:

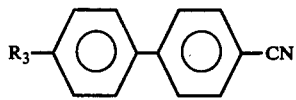

where $R_3$ is an alkyl or alkoxy group of 1 to 8 carbons with no chain branches on the $\alpha$ or $\beta$ carbons.

7. An eutectic liquid crystal mixture, as recited in claim 1, wherein said acceptor compound is p-cyano-p'-pentylbiphenyl (CPB).

8. An eutectic liquid crystal mixture, as recited in claim 1, wherein said acceptor compound is p-cyano-p'-heptylbiphenyl.

9. An eutectic liquid crystal mixture, as recited in claim 1, wherein said acceptor compound is p-cyano-p'-pentyloxybiphenyl.

10. An eutectic liquid crystal mixture, as recited in claim 1, wherein said acceptor compound is p-cyano-p'-heptyloxybiphenyl.

11. An eutectic liquid crystal mixture, as recited in claim 1, wherein said acceptor compound is p-cyano-p'-octyloxybiphenyl.

12. An eutectic liquid crystal mixture of p-cyano-p'-pentylbiphenyl and N-(p-methoxybenzylidene)-p-n-butylaniline.

* * * * *